(12) United States Patent
Kawashima

(10) Patent No.: US 8,360,053 B2
(45) Date of Patent: Jan. 29, 2013

(54) SUNLIGHT COLLECTING HEAT RECEIVER

(75) Inventor: Hiroshi Kawashima, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 462 days.

(21) Appl. No.: 12/607,286

(22) Filed: Oct. 28, 2009

(65) Prior Publication Data

US 2010/0242949 A1    Sep. 30, 2010

(30) Foreign Application Priority Data

Mar. 30, 2009 (JP) ............... P2009-081823

(51) Int. Cl.
*F24J 2/24* (2006.01)

(52) U.S. Cl. ........ 126/651; 126/656; 126/663; 126/670; 126/688; 60/641.11; 60/641.15; 60/641.8

(58) Field of Classification Search .......... 126/651, 126/656, 663, 670, 688; 60/641.8, 641.11, 60/641.15
See application file for complete search history.

(56) References Cited

U.S. PATENT DOCUMENTS

| | | | | |
|---|---|---|---|---|
| 3,905,352 A | * | 9/1975 | Jahn | 126/578 |
| 3,924,604 A | * | 12/1975 | Anderson | 126/606 |
| 3,951,128 A | * | 4/1976 | Schoenfelder | 126/691 |
| 4,002,160 A | * | 1/1977 | Mather, Jr. | 126/655 |
| 4,015,584 A | * | 4/1977 | Haberman | 126/600 |
| 4,117,682 A | * | 10/1978 | Smith | 60/641.8 |
| 4,136,674 A | * | 1/1979 | Korr | 126/607 |
| 4,137,899 A | * | 2/1979 | Weslow | 126/649 |
| 4,164,123 A | * | 8/1979 | Smith | 60/641.11 |
| 4,245,618 A | * | 1/1981 | Wiener | 126/643 |
| 4,344,673 A | * | 8/1982 | Holdridge | 359/852 |
| 4,421,102 A | * | 12/1983 | Posnansky et al. | 126/647 |
| 4,485,803 A | * | 12/1984 | Wiener | 126/591 |
| 4,512,336 A | * | 4/1985 | Wiener | 126/651 |

(Continued)

FOREIGN PATENT DOCUMENTS

| | | |
|---|---|---|
| EP | 1746363 A2 | 1/2007 |
| JP | 50-122945 A | 9/1975 |

(Continued)

OTHER PUBLICATIONS

Development of High Efficency Solar Heat Power Generation System, Mitsubishi Heavy Industry Technical Report vol. 31, No. 4, p. 239-242, (Jul. 1994).

(Continued)

*Primary Examiner* — Kenneth Rinehart
*Assistant Examiner* — Jorge Pereiro
(74) *Attorney, Agent, or Firm* — Kanesaka, Berner & Partners, LLP

(57) ABSTRACT

A sunlight collecting heat receiver includes: a heat-exchange heat receiving tube which receives sunlight collected by heliostats and transfers the sunlight to a heat carrier, wherein the heat-exchange heat receiving tube includes an outward-flow heat receiving tube which is disposed on the upstream in a sunlight incident direction and an inward-flow heat receiving tube which is connected to the outward-flow heat receiving tube through a U tube and is disposed on the downstream in the sunlight incident direction, and wherein the outward-flow heat receiving tube and the inward-flow heat receiving tube are arranged so as to be deviated from each other in the transverse direction perpendicular to the height direction when seen in the sunlight incident direction.

5 Claims, 12 Drawing Sheets

U.S. PATENT DOCUMENTS

| | | | | |
|---|---|---|---|---|
| 4,869,234 A * | 9/1989 | Rapozo | .................. | 126/656 |
| 5,850,831 A * | 12/1998 | Marko | .................. | 126/645 |
| 5,862,800 A * | 1/1999 | Marko | .................. | 126/680 |
| 6,926,440 B2 * | 8/2005 | Litwin | .................. | 374/124 |
| 6,931,851 B2 * | 8/2005 | Litwin | .................. | 60/641.11 |
| 6,957,536 B2 * | 10/2005 | Litwin et al. | .................. | 60/641.8 |
| 7,011,086 B2 * | 3/2006 | Litwin | .................. | 126/651 |
| 7,296,410 B2 * | 11/2007 | Litwin | .................. | 60/641.12 |
| 7,690,377 B2 * | 4/2010 | Goldman et al. | .................. | 126/655 |
| 2004/0112374 A1 * | 6/2004 | Litwin | .................. | 126/680 |
| 2005/0126170 A1 * | 6/2005 | Litwin | .................. | 60/641.8 |
| 2009/0173337 A1 | 7/2009 | Tamaura et al. | | |
| 2009/0241938 A1 * | 10/2009 | Arbogast et al. | .................. | 126/643 |
| 2009/0241939 A1 * | 10/2009 | Heap et al. | .................. | 126/645 |
| 2011/0114085 A1 * | 5/2011 | Plotkin et al. | .................. | 126/704 |

FOREIGN PATENT DOCUMENTS

| | | |
|---|---|---|
| JP | 55096891 | 7/1980 |
| JP | 3025086 U | 6/1996 |
| JP | 2003-262403 A | 9/2003 |

OTHER PUBLICATIONS

Development of High Efficiency Solar Heat Power Generation System, Mitsubishi Heavy Industry Technical Report vol. 31, No. 4, p. 239-242, (Jul. 1994).

Written Opinion and Search Report of corresponding application No. PCT/JP2009/005798 mailed Jan. 12, 2010.

* cited by examiner

FIG. 3

| DESIGN CONDITION IN ACCORDANCE WITH FLOW INSIDE HEAT RECEIVING TUBE OF SUNLIGHT COLLECTING HEAT RECEIVER ||||
|---|---|---|---|
| LOWER PORTION OF FRONT HEAT RECEIVING TUBE | UPPER PORTION OF FRONT HEAT RECEIVING TUBE | UPPER PORTION OF REAR HEAT RECEIVING TUBE | LOWER PORTION OF REAR HEAT RECEIVING TUBE |
| | U PORTION |||
| LARGE EFFECTIVE HEAT RECEIVING AREA || SMALL EFFECTIVE HEAT RECEIVING AREA ||
| WEAK SUNLIGHT INTENSITY | STRONG SUNLIGHT INTENSITY || WEAK SUNLIGHT INTENSITY |
| LOW SURFACE TEMPERATURE  LARGE CONFIGURATION FACTOR  MIDDLE HEAT FLUX | MIDDLE SURFACE TEMPERATURE  MIDDLE CONFIGURATION FACTOR  HIGH HEAT FLUX | HIGH SURFACE TEMPERATURE  SMALL CONFIGURATION FACTOR  MIDDLE HEAT FLUX | HIGH SURFACE TEMPERATURE SMALL CONFIGURATION FACTOR  LOW HEAT FLUX |

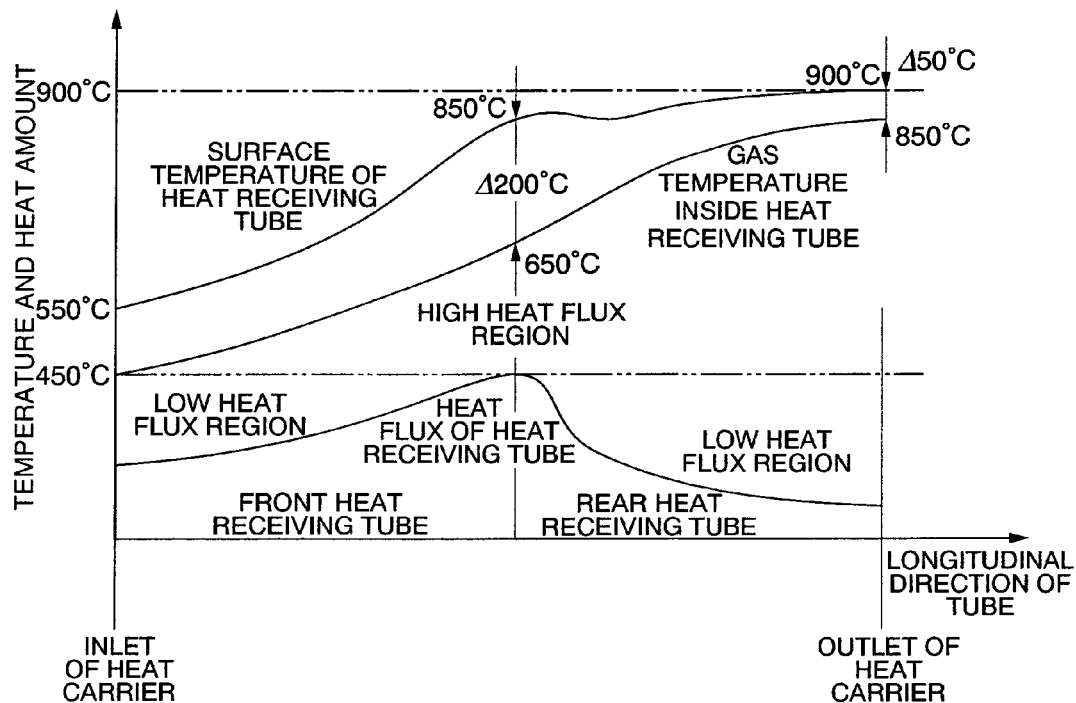

FIG. 4

SUNLIGHT COLLECTING HEAT RECEIVER

TECHNICAL FIELD

The present invention relates to a basic structure of a sunlight collecting heat receiver used in a solar thermal power system, a solar thermal chemical plant, or the like, the sunlight collecting heat receiver being designed to collect sunlight, convert them into high thermal energy, and transfer the thermal energy to a heat carrier through thermal conduction.

Priority is claimed on Japanese Patent Application No. 2009-081823, filed Mar. 30, 2009, the content of which is incorporated herein by reference.

BACKGROUND ART

In a high-temperature solar heat application system, generally, the sunlight and heat are collected using a mirror. As the combination of a sunlight collecting apparatus and a heat receiving apparatus, there are two types of combinations, that is, a trough sunlight collecting type in which the sunlight collecting apparatus and the heat receiving apparatus are mechanically integrated with each other and are disposed at a position close to the ground and a tower collecting type in which the heat receiving apparatus is disposed on a tall tower and plural collecting reflection ray control mirrors called heliostats are disposed on the ground in the periphery of the heat receiving apparatus so that the heat receiving apparatus on the tower collects the sunlight.

In the tower sunlight collecting type which will be described in the present invention, in order to more improve the efficiency of a generation cycle in the case of an electric generation plant, a heat carrier, which is considered an increase in temperature, used for a heat-exchange operation in a sunlight collecting heat receiver has been developed.

In the case of an increase in temperature, a temperature of a material forming a heat receiving tube of the heat receiver is extremely close to the allowable temperature due to the high-temperature heat carrier, and a temperature of the heat receiver is locally different, which causes a problem such that the heat collecting operation cannot be reliably performed.

An outline of a known tower-type heat receiver will be described with reference to FIGS. 10 to 17.

As shown in FIG. 11, a tower-type heat receiver 52 for collecting the sunlight and heat in all areas is developed in accordance with the arrangement of heliostats 50 provided in all areas of 360 degrees in the periphery of a tower 51 shown in FIG. 10. However, since heat receiving tubes 53 are exposed to the outside, a problem arises in that the convection and radiation heat losses are large. For this reason, as shown in FIG. 12, a cavity heat receiver 55 having the heat receiving tubes 53 inside a casing 54 is developed.

In the arrangement of the heliostats provided in all areas in the periphery of the tower, since the effective areas of the mirrors are largely different in the southern and northern areas in accordance with the degree of the incident and reflection angles of the heliostats in the actual facility installation condition in the subtropical high-pressure belt having satisfactory solar radiation, a problem arises in that the effective areas of the mirrors in one of the southern and northern areas are poor.

For this reason, in recent years, as shown in FIG. 13, a heat receiver 61 of a so-called one-side arrangement type has been constructed in which the heliostats 60 are intensively arranged in an area where the effective areas of the mirrors are large in accordance with an actual variation in altitude of the sun. As shown in FIG. 14, the heat receiver 61 has a structure in which the heat receiving tubes 62 are arranged in a curve surface or a substantially polygonal surface within an angular range equal to or less than 180 degrees of the radius in a plan view. In the heat receiver 61, since the height direction of the heat receiving tube is aligned in the horizontal direction, the actual light receiving distribution is high at the center of the heat receiver body in the height direction, and hence there is a tendency that the thermal load of a part of the heat receiving tubes 62 increases. Further, as shown in FIG. 15, the front surfaces of the heat receiving tubes 62 are opened to the outside so as to receive the incident sunlight (the opening is denoted by the reference numeral 63).

Meanwhile, there is known a technology in the Patent Document. A solar heat collector 70 disclosed in the Patent Document 1 is shown in FIGS. 16 and 17. FIG. 17 is a sectional view taken along the line XVI-XVI in FIG. 16. As shown in FIG. 17, there is provided a heat collector 74 including a spirally wound heat carrier circulation tube 73 (heat-exchange heat receiving tube) in which a heat carrier is circulated through a heat carrier introduction portion 71 and a heat carrier extraction portion 72, where a light receiving surface 75 of the heat collector is formed by the outer peripheral surface of the heat carrier circulation tube 73 exposed to the inside of the heat collector.

In addition, the heat carrier introduction portion 71 is provided in the center of the heat carrier circulation tube 73, and the heat carrier extraction portion 72 is provided in the outer periphery of the heat carrier circulation tube 73. Accordingly, the heat carrier inside the heat carrier circulation tube 73 is circulated from the center of the spiral shape to the outer periphery thereof. In addition, the light receiving surface 75 of the heat collector 74 is formed in a curve shape converged toward a sunlight introduction opening.

CITATION LIST

[Patent Document]
[PATENT DOCUMENT 1] PCT Publication No. WO 2006/025449

SUMMARY OF THE INVENTION

Problem that the Invention is to Solve

In the known technology and the Patent Document 1, as shown in FIG. 17, the heat carrier introduced from the heat carrier introduction portion 71 into the heat carrier circulation tube 73 is circulated from the center of the spiral shape toward the outer periphery thereof. For this reason, since the temperature of the heat carrier circulation tube 73 in the vicinity of the heat carrier extraction portion 71 is high, a problem arises in that the temperature of the heat carrier circulation tube is substantially close to the allowable temperature or exceeds the allowable temperature.

For this reason, it is necessary to prevent the heat receiver from being damaged due to the deterioration of the material strength or the thermal stress generated by the overload of the local thermal load in such a manner that the light receiving position is highly precisely controlled in order to suppress the temperature of the heat receiving tube which is the heat carrier circulation tube 73 within the allowable temperature of the material forming the heat receiving tube. In addition, it is thought that the damage of the heat receiving tube becomes severe due to a locally high temperature of the heat receiving tube caused by the large radiation or convection heat losses in the heat receiving tube. Further, in the heat receiver which is the heat collector 74, a problem arises in that there is a large difference in temperature between the outside heat receiving tube wall surface which is not illuminated by the sunlight and the inside heat receiving tube wall surface which is illuminated by the sunlight.

The present invention is contrived in consideration of the above-described circumstance, and an object of the invention is to provide a sunlight collecting heat receiver capable of efficiently transferring thermal energy obtained from a sunlight by preventing a problem that a heat receiving tube is locally heated to thereby exceed an allowable temperature thereof and preventing a deterioration in conversion efficiency between sunlight incident energy and thermal energy of the heat receiver due to radiation and convection heat losses in the heat receiving tube.

Means for Solving the Problem

In order to achieve the above-described object, in an aspect of the present invention, there is provided a sunlight collecting heat receiver including: a heat-exchange heat receiving tube which receives sunlight collected by heliostats and transfers the sunlight to a heat carrier, wherein the heat-exchange heat receiving tube includes an outward-flow heat receiving tube which is disposed on the upstream in a sunlight incident direction and an inward-flow heat receiving tube which is connected to the outward-flow heat receiving tube through a U tube and is disposed on the downstream in the sunlight incident direction, and wherein the outward-flow heat receiving tube and the inward-flow heat receiving tube are arranged so as to be deviated from each other in the transverse direction perpendicular to the height direction when seen in the sunlight incident direction.

In the sunlight collecting heat receiver with the above-described configuration, the heat-exchange heat receiving tube transferring the energy of the sunlight to the heat carrier therein includes the outward-flow heat receiving tube disposed on the upstream in the sunlight incident direction and the inward-flow heat receiving tube connected to the outward-flow heat receiving tube through the U tube and disposed on the downstream in the sunlight incident direction, and the outward-flow heat receiving tube and the inward-flow heat receiving tube are arranged so as to be deviated from each other in the transverse direction perpendicular to the height direction when seen in the sunlight incident direction. For example, the outward-flow heat receiving tube and the inward-flow heat receiving tube are alternately arranged at the sunlight incident position. Accordingly, it is possible to reliably increase the temperature of the heat carrier circulating inside the outward-flow heat receiving tube and the inward-flow heat receiving tube. As a result, it is possible to uniformly increase the temperature of the heat-exchange heat receiving tube including the outward-flow heat receiving tube and the inward-flow heat receiving tube. Further, since the inward-flow heat receiving tube in which the temperature of the heat carrier increases and which is disposed on the downstream in the sunlight incident direction is located at the shade of the outward-flow heat receiving tube, it is possible to reliably reduce the heat receiving amount, and thus to suppress the temperature rise of the surface of the inward-flow heat receiving tube. As a result, since it is possible to prevent the known problem in which the heat receiving tube is locally heated to thereby exceed the allowable temperature, the heat receiving tube is capable of efficiently transferring the thermal energy obtained from the sunlight.

In the sunlight collecting heat receiver according to the aspect, a reflection mirror may be provided on the downstream in the sunlight incident direction of the inward-flow heat receiving tube.

In this case, since the reflection mirror is provided on the downstream in the sunlight incident direction of the inward-flow heat receiving tube, the reflection mirror is capable of reflecting the sunlight incident via a gap between the outward-flow heat receiving tube and the inward-flow heat receiving tube arranged to be deviated from each other in the transverse direction perpendicular to the height direction when seen in the sunlight incident direction. In addition, the reflected light of the reflection mirror are capable of illuminating the rear surfaces of the outward-flow heat receiving tube and the inward-flow heat receiving tube, it is possible to heat the rear surfaces of the outward-flow heat receiving tube and the inward-flow heat receiving tube. That is, it is possible to heat both front and rear surfaces of the outward-flow heat receiving tube and the inward-flow heat receiving tube. For this reason, it is possible to uniformly increase the temperature of the heat-exchange heat receiving tube including the outward-flow heat receiving tube and the inward-flow heat receiving tube. As a result, it is possible to prevent the known problem in which the heat receiving tube is locally heated and temperature thereof exceeds the allowable temperature.

In the sunlight collecting heat receiver according to the present invention, a plurality of the heat-exchange heat receiving tubes may be provided so that the outward-flow heat receiving tubes and the inward-flow heat receiving tubes are deviated from each other in the transverse direction perpendicular to the height direction when seen in the sunlight incident direction.

In this case, since the plurality of heat-exchange heat receiving tubes is provided so that the outward-flow heat receiving tubes and the inward-flow heat receiving tubes are deviated from each other in the transverse direction perpendicular to the height direction when seen in the sunlight incident direction, it is possible to reliably increase the temperature of the heat carrier circulating inside the plurality of outward-flow heat receiving tubes and inward-flow heat receiving tubes at the sunlight incident position. As a result, it is possible to uniformly increase the temperature of the heat-exchange heat receiving tubes including the plurality outward-flow heat receiving tubes and inward-flow heat receiving tubes.

In the sunlight collecting heat receiver according to the present invention, a reflection surface of the reflection mirror may be provided with a reflector which changes the direction of each of the sunlight passing through a gap between the heat-exchange heat receiving tubes.

In this case, since the reflection surface of the reflection mirror is provided with a reflector for changing the direction of each of the sunlight passing through a gap between the heat-exchange heat receiving tubes, it is possible to prevent the reflected light of the reflector from returning to the upstream in the sunlight incident direction by using the reflector. Also, since the thermal energy is obtained in such a manner that the reflected light illuminates the rear surface of the heat-exchange heat receiving tube, it is possible to add the thermal energy to the output of the energy of the heat receiver.

Advantage of Invention

In the sunlight collecting heat receiver according to the present invention, the heat-exchange heat receiving tube transferring the energy of the sunlight to the heat carrier therein includes the outward-flow heat receiving tube disposed on the upstream in the sunlight incident direction and the inward-flow heat receiving tube connected to the outward-flow heat receiving tube through the U tube and disposed on the downstream in the sunlight incident direction, and the outward-flow heat receiving tube and the inward-flow heat receiving tube are arranged so as to be deviated from each other in the transverse direction perpendicular to the height direction when seen in the sunlight incident direction. For example, the outward-flow heat receiving tube and the inward-flow heat receiving tube are alternately arranged at the sunlight incident position. Accordingly, it is possible to reliably increase the temperature of the heat carrier circulating inside the outward-flow heat receiving tube and the inward-flow heat receiving tube, and thus to uniformly increase the temperature of the heat-exchange heat receiving tube including the outward-flow heat receiving tube and the inward-flow heat receiving tube. Further, since the inward-flow heat receiving tube in which the temperature of the heat carrier increases and which is disposed on the downstream in the sunlight incident direction is located at the shade of the outward-flow heat receiving tube, it is possible to reliably reduce the heat receiving amount, and thus to suppress the temperature rise of the surface of the inward-flow heat receiving tube. Particularly, it is possible to suppress the temperature rise in the vicinity of the heat receiving tube outlet. As a result, since it is possible to prevent the known problem in which the heat receiving tube is locally heated and temperature thereof exceeds the allowable temperature, the heat receiving tube is capable of efficiently transferring the thermal energy obtained from the sunlight.

BRIEF DESCRIPTION OF THE DRAWINGS

FIG. 3 is a table illustrating a relationship between a position of a heat receiving tube, a solar radiation, a temperature, a configuration factor, and a heat flux.

FIG. 4 is a graph illustrating a relationship between a position of a heat receiving tube, and a temperature and a heat flux.

DESCRIPTION OF EMBODIMENTS

Embodiment 1

Figure 1:
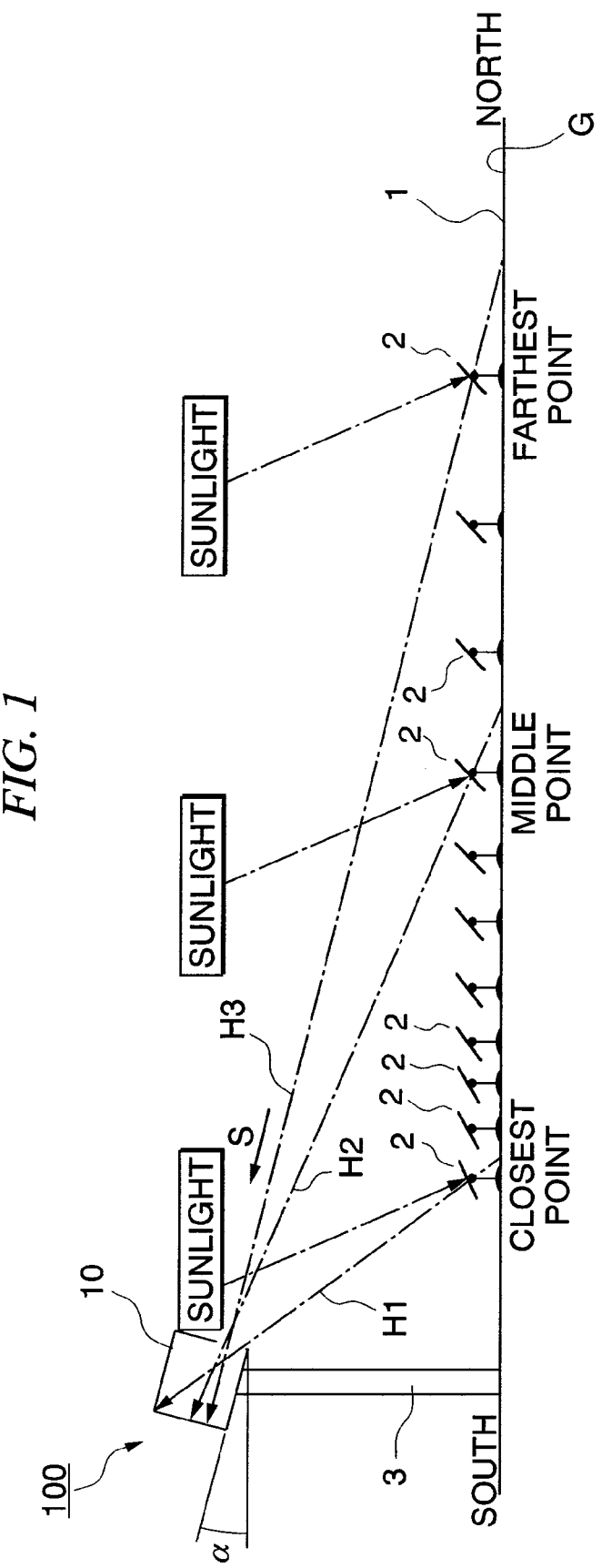
FIG. 1 is an explanatory diagram illustrating a positional relationship between a heliostat and a tower-type sunlight collecting heat receiver.

An exemplary embodiment of the invention will be described with reference to FIGS. 1 to 9. The reference numeral 1 denotes a heliostat field which is installed in a ground G A plurality of heliostats 2 is arranged on the heliostat field 1 so as to reflect the sunlight. A tower-type sunlight collecting heat receiver 100 is installed in the south end of the heliostat field 1 so as to receive the sunlight guided by the heliostats 2.

In addition, a suitable place for the solar thermal power system in the world is an arid region of a subtropical high-pressure belt which is strongly favorable to direct solar radiation. The time zone where the altitude of the sun is high at daytime and the electric generation is suitably performed is located in the north hemisphere where the sun is located in the southern area throughout the year. As a result of the consideration of the arrangement of the position where the COS efficiency of the heliostats 2 is more satisfactory, it is desirable to select the arrangement in which the tower-type sunlight collecting heat receiver 100 is installed at the south end of the heliostat field 1 and the heliostats 2 are installed northward.

The tower-type sunlight collecting heat receiver 100 includes a tower 3 which is installed to be upright in the ground G and a collecting heat receiver 10 which is installed on the tower potion 3.

Figure 2:
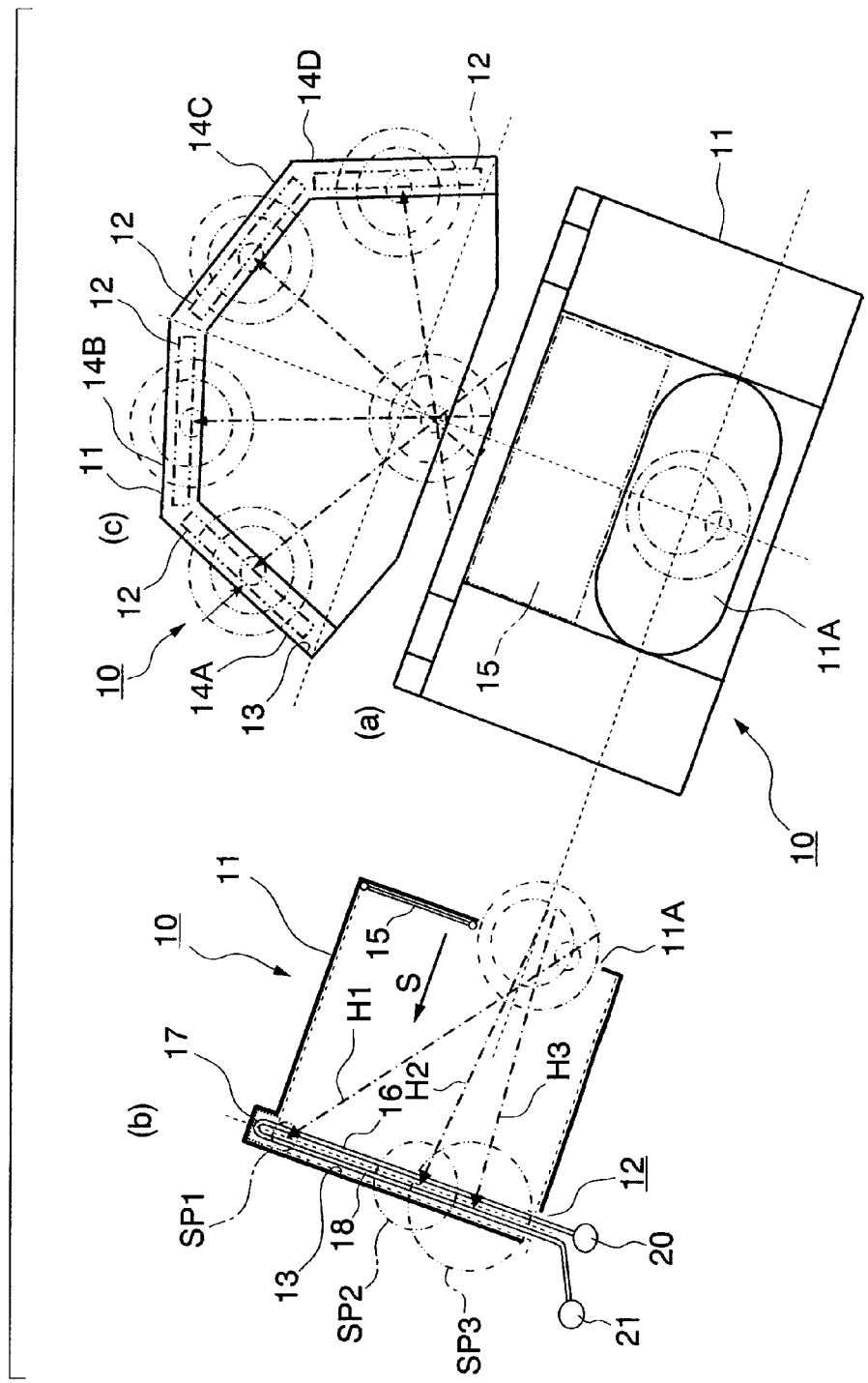
FIG. 2 is view illustrating an entire configuration of the sunlight collecting heat receiver, where (a) is a front view, (b) is a side view, and (c) is a cross-sectional view.

As shown in FIG. 2, the collecting heat receiver 10 includes a heat receiver body 11 which forms a casing and a heat-exchange heat receiving tube 12 which is installed on the downstream of the sunlight incident direction (a direction depicted by the arrow S) in the heat receiver body 11. An inner wall surface 13 of the heat receiver body 11 provided with the heat-exchange heat receiving tube 12 is formed in a polygonal shape.

In addition, in the inner wall surface 13 of the polygonal heat receiver body 11, the reference numeral 14A denotes a heat receiving tube installation portion which is installed to face a northwestern opening, the reference numeral 14B denotes a heat receiving tube installation portion which is installed to face a north-northwestern opening, the reference numeral 14C denotes a heat receiving tube installation portion which is installed to face a north-northeastern opening, and the reference numeral 14D denotes a heat receiving tube installation portion which is installed to face a northeastern opening.

A front surface of the heat receiver body 11 is provided with an opening 11A which guides the sunlight into the heat receiver body 11, and the opening 11A is provided with a shutter 15. The shutter 15 is adapted to promptly close the entire opening 11A on the basis of a trip command for the purpose of stopping the energy supply when a solar application system is abnormal and preventing the heat receiving tube from being burnt out due to a decrease in amount of a heat carrier when the system is abnormal. The opening 11A is formed to be elongate in the transverse direction, and both ends thereof are formed to be round in accordance with the spot diameter of the sunlight.

As shown in FIG. 2, the heat-exchange heat receiving tube 12 disposed inside the collecting heat receiver 10 has a two-path structure including an outward-flow heat receiving tube 16 which is located on the upstream in the sunlight incident direction (the direction depicted by the arrow S) and an inward-flow heat receiving tube 18 which is connected to the outward-flow heat receiving tube 16 through a U tube 17 and is disposed on the downstream in the sunlight incident direction (the direction depicted by the arrow S). In addition, a plurality of the heat-exchange heat receiving tubes 12 is installed inside the heat receiving tube installation portions 14A to 14D so as to be substantially upright therein while the lower portions thereof are supported to the heat receiver body 11.

Each of the outward-flow heat receiving tubes 16 of the heat-exchange heat receiving tubes 12 is connected to a heat receiving tube inlet header 20 to which the heat carrier is supplied. Each of the inward-flow heat receiving tubes 18 of the heat-exchange heat receiving tubes 12 is connected to a heat receiving tube outlet header 21 from which the heated heat carrier is discharged. In addition, the heat carrier discharged from the heat receiving tube outlet header 21 is directly used to drive a generator turbine producing electricity. Alternatively, the heat carrier is supplied to a heat exchanger (not shown), and a secondary heat carrier generated by the heat exchanger is used to drive the generator turbine producing electricity.

The heliostats 2 installed on the heliostat field 1, and the outward-flow heat receiving tube 16 and the inward-flow heat receiving tube 18 constituting the heat-exchange heat receiving tube 12 of the collecting heat receiver 10 have the following positional relationship.

That is, as shown in FIG. 1 and (b) of FIG. 2, a depression angle (denoted by a in FIG. 1) as an installation angle of the heat receiver body 11 is set so that the sunlight (denoted by the reference numeral H1) of the heliostat 2 located at the closest point closest to the collecting heat receiver 10 illuminate an upper portion SP1 of the heat-exchange heat receiving tube 12, the sunlight (denoted by the reference numeral H2) of the heliostat 2 located at the middle point (a point in the middle of the closest point and the farthest point) from the collecting heat receiver 10 illuminate the middle portion SP2 of the heat-exchange heat receiving tube 12, and the sunlight (denoted by the reference numeral H3) of the heliostat 2 located at the farthest point from the collecting heat receiver 10 illuminate the lower portion SP3 of the heat-exchange heat receiving tube 12.

By means of the set positional relationship, the sunlight (denoted by the reference numeral H1) at the closest point having the strong solar radiation intensity illuminate the upper portion SP1 of the heat-exchange heat receiving tube 12, the sunlight (denoted by the reference numeral H2) located at the middle point having the middle solar radiation intensity illuminate the middle portion SP2 of the heat-exchange heat receiving tube 12, and the sunlight (denoted by the reference numeral H3) located at the farthest point having a weak solar radiation intensity illuminate the lower portion SP3 of the heat-exchange heat receiving tube 12. In addition, since the upper portion SP1 of the heat-exchange heat receiving tube 12 illuminated by the sunlight (denoted by the reference numeral H1) at the position having the strong heat radiation intensity has a high temperature, the distance between the upper portion SP1 and the opening 11A of the heat receiver body 11 is set to be large, whereby the configuration factor causing radiation heat loss is set to be small.

By means of the set positional relationship, the heliostats 2 installed on the heliostat field 1 and the outward-flow heat receiving tube 16 and the inward-flow heat receiving tube 18 constituting the heat-exchange heat receiving tube 12 of the collecting heat receiver 10 have the heat receiving distribution shown in FIGS. 3 and 4.

In detail, by means of the positional relationship between the heliostats 2 and the heat-exchange heat receiving tube 12, as shown in FIGS. 3 and 4, the "configuration factor" causing radiation heat loss of the rear heat-exchange heat receiving tube 12 (the inward-flow heat receiving tube 18) becomes smaller than that of the front heat-exchange heat receiving tube 12 (the outward-flow heat receiving tube 16), and the "heat flux" in the vicinity of the center (the U tube 17) becomes large in the flow direction of the heat carrier inside the heat-exchange heat receiving tube 12. Accordingly, it is possible to suppress the "heat flux" in the vicinity of the heat receiving tube outlet header 21 where the temperature of the heat carrier is substantially equal to the maximum temperature, and to prevent the temperature of the material forming the heat-exchange heat receiving tube 12 from exceeding the allowable temperature.

By means of the positional relationship between the heliostats 2 and the heat-exchange heat receiving tube 12, the following advantages (1) and (2) are obtained.

(1) The heat flux in the vicinity of the center in the flow direction of the heat carrier inside the heat-exchange heat receiving tube 12 becomes large, and the heat flux in the vicinity of the heat receiving tube outlet head 21 in which the temperature of the heat carrier is substantially equal to the maximum temperature. Accordingly, it is possible to reliably prevent the temperature of a material forming the heat-exchange heat receiving tube 12 from exceeding the allowable temperature.

(2) In order to minimize the radiation and convection heat loss from the surface of the heat-exchange heat receiving tube 12, a cavity structure is adopted so as to minimize an area where the high-temperature portion of the heat-exchange heat receiving tube 12 is exposed to the outside. In order to minimize the radiation and convection heat loss from the opening 11A to which the sunlight of the heat loss are incident, a distance between the high-temperature upper portion of the heat-exchange heat receiving tube 12 and the opening 11A is set to be large, and the low-temperature inward-flow heat receiving tube 16 is disposed on the side of the high-temperature inward-flow heat receiving tube 18 on the side of the opening 11A so as to decrease the configuration factor of the high-temperature tube causing the radiation heat loss.

Next, an example of the arrangement of the heat-exchange heat receiving tube 12 including the outward-flow heat receiving tube 16, the U tube 17, and the inward-flow heat receiving tube 18 will be described with reference to FIGS. 5 to 7.

One heat receiving tube body 30 is formed by one pair of three heat-exchange heat receiving tubes 12 (hereinafter, one pair of three heat-exchange heat receiving tubes 12 will be referred to as the heat receiving tube body 30). In the three heat-exchange heat receiving tubes 12 of the heat receiving tube body 30, two heat-exchange heat receiving tubes 12 (denoted by the reference numerals 12A and 12B) disposed in parallel to each other, and one heat-exchange heat receiving tube 12 (denoted by the reference numeral 12C) is disposed so as to pass over the two heat-exchange heat receiving tubes 12 disposed in parallel to each other.

In addition, regarding the heat-exchange heat receiving tubes 12 of the heat receiving tube body 30, the outward-flow heat receiving tubes 16 are arranged at the same interval along the inner wall surface 13 on the upstream in the sunlight incident direction (a direction depicted by the arrow S), and the inward-flow heat receiving tubes 18 are arranged at equal intervals along the inner wall surface 13 on the downstream in the sunlight incident direction (a direction depicted by the arrow S). That is, the front-side portion having the high thermal load is set to the outward-flow heat receiving tube 16, and the rear-side portion having the low thermal load is set to the inward-flow heat receiving tube 18.

In the heat-exchange heat receiving tube 12 having the two-path structure in which the outward-flow heat receiving tube 16 is connected to the inward-flow heat receiving tube 18 via the U tube 17, the lower portions of the U tube 17, the outward-flow heat receiving tube 16, and the inward-flow heat receiving tube 18 are supported to the heat receiver body 11, and the upper portions thereof are opened. Accordingly, since the size distortion caused by a heat is easily absorbed, the thermal stress hardly occurs. In addition, since a gap between the adjacent heat receiving tube bodies 30 is ensured, the heat receiving tube bodies 30 are easily supported to the inner wall surface 13 of the heat receiver body 11.

In the heat-exchange heat receiving tubes 12 of the heat receiving tube bodies 30, the outward-flow heat receiving tubes 16 and the inward-flow heat receiving tubes 18 are arranged and deviated from each other in the transverse direction perpendicular to the height direction so as to have a zigzag shape when seen in the sunlight incident direction (the direction depicted by the arrow S). Accordingly, the front surfaces of the outward-flow heat receiving tubes 16 and the inward-flow heat receiving tubes 18 can be illuminated by the sunlight.

Figure 7:
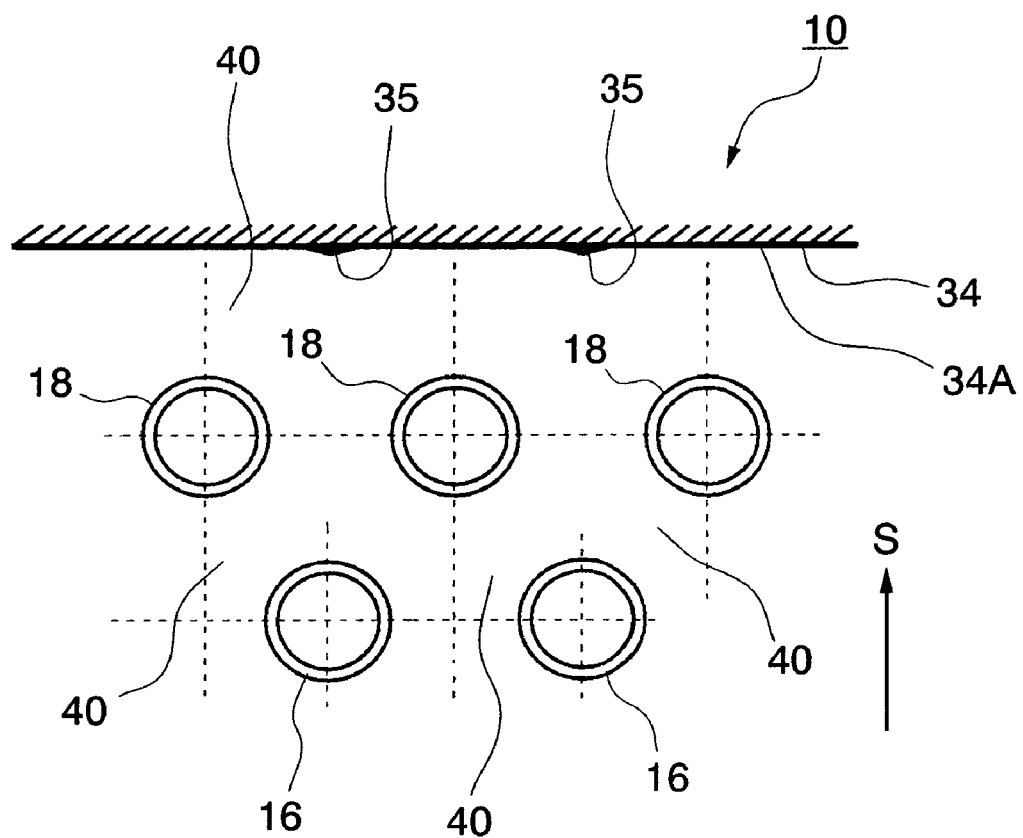
FIG. 7 is a plan view illustrating a positional relationship between an inner wall surface of a heat receiver body, and an outward-flow heat receiving tube and an inward-flow heat receiving tube.

In the respective portions of the polygonal inner wall surface 13 shown in FIG. 7, a plurality of the heat receiving tube bodies 30 is arranged so that a gap 40 between the outward-flow heat receiving tubes 16, a gap 40 between the inward-flow heat receiving tubes 18, a gap 40 between the outward-flow heat receiving tube 16 and the inward-flow heat receiving tube 18, and a gap between the outward-flow heat receiving tube 16, the inward-flow heat receiving tube 18, and a reflection mirror 34 to be described later are substantially equal to each other.

Figure 6:
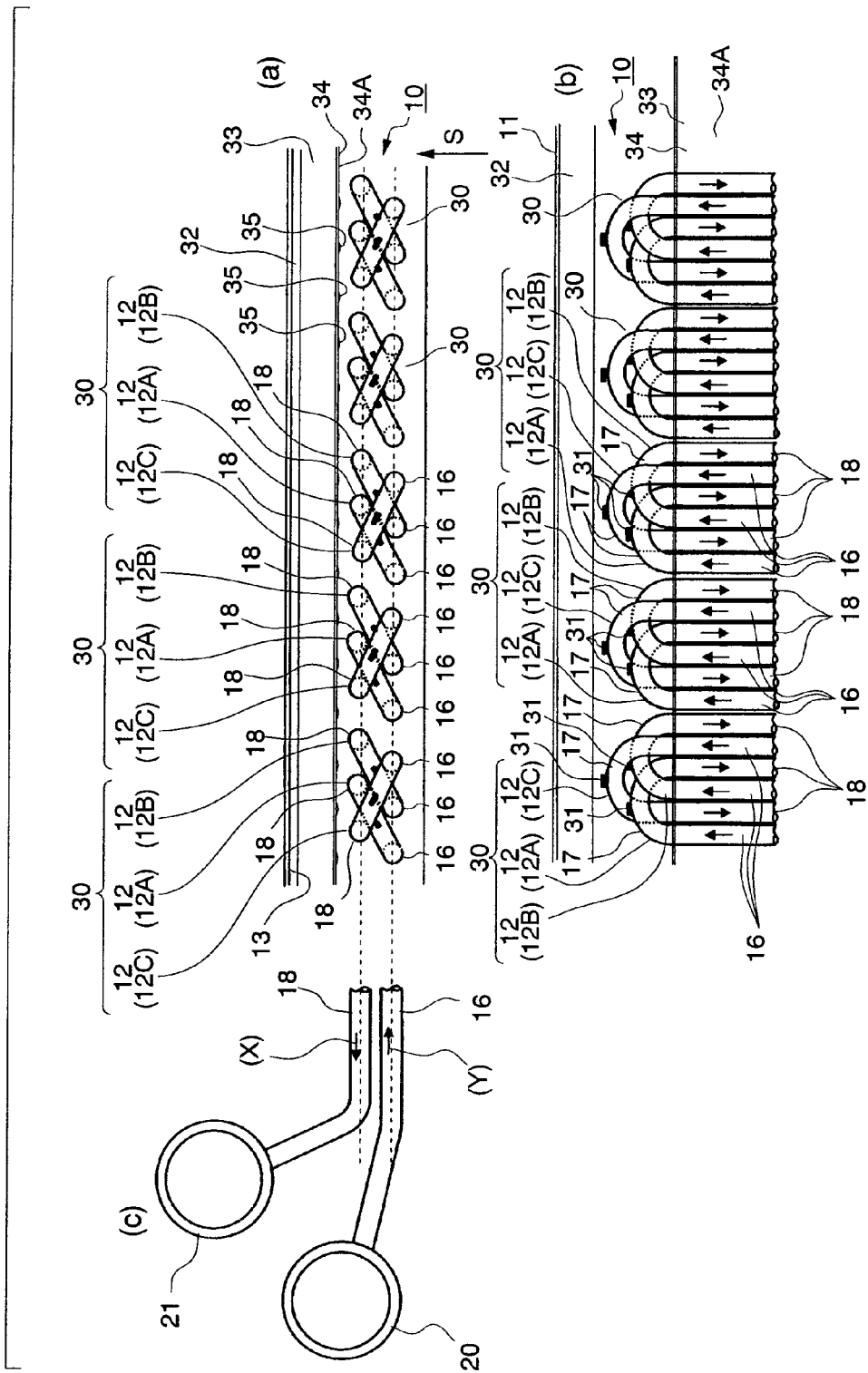
FIG. 6 is view illustrating an example of a positional relationship between a heat receiver body, and an outward-flow heat receiving tube, a U tube, and an inward-flow heat receiving tube constituting a heat-exchange heat receiving tube, where (a) is a plan view, (b) is a front view, and (c) is a view illustrating an inlet header and an outlet header.

The arrangement of the outward-flow heat receiving tubes 16 and the inward-flow heat receiving tubes 18 when seen in the sunlight incident direction (the direction depicted by the arrow S) is shown in FIG. 6. In addition, as understood by (b) of FIG. 6, the outward-flow heat receiving tubes 16 and the inward-flow heat receiving tubes 18 are alternately arranged at the sunlight incident position. Accordingly, as shown by the arrows X and Y, it is possible to reliably increase the temperature of the heat carriers circulating inside the outward-flow heat receiving tubes 16 and the inward-flow heat receiving tubes 18. As a result, the temperature of the heat-exchange heat receiving tube 12 uniformly increases as a whole instead of the local temperature rise of the heat-exchange heat receiving tube, and the inward-flow heat receiving tube 18 which is located on the downstream in the sunlight incident direction (the direction depicted by the arrow S) and in which the temperature of the heat carrier increases is located at the shade of the inward-flow heat receiving tube 16 so as to reliably reduce the heat receiving amount. Accordingly, it is possible to suppress the temperature rise of the surface of the inward-flow heat receiving tube 18, and particularly, to suppress the temperature rise in the vicinity of the heat receiving tube outlet.

In addition, a temperature sensor 31 is installed at the top portion of the U tube 17 of each of the heat-exchange heat receiving tubes 12 so as to monitor whether the temperature of the heat carrier circulating inside the heat-exchange heat receiving tube 12 is equal to or more than the allowable temperature.

Figure 5:
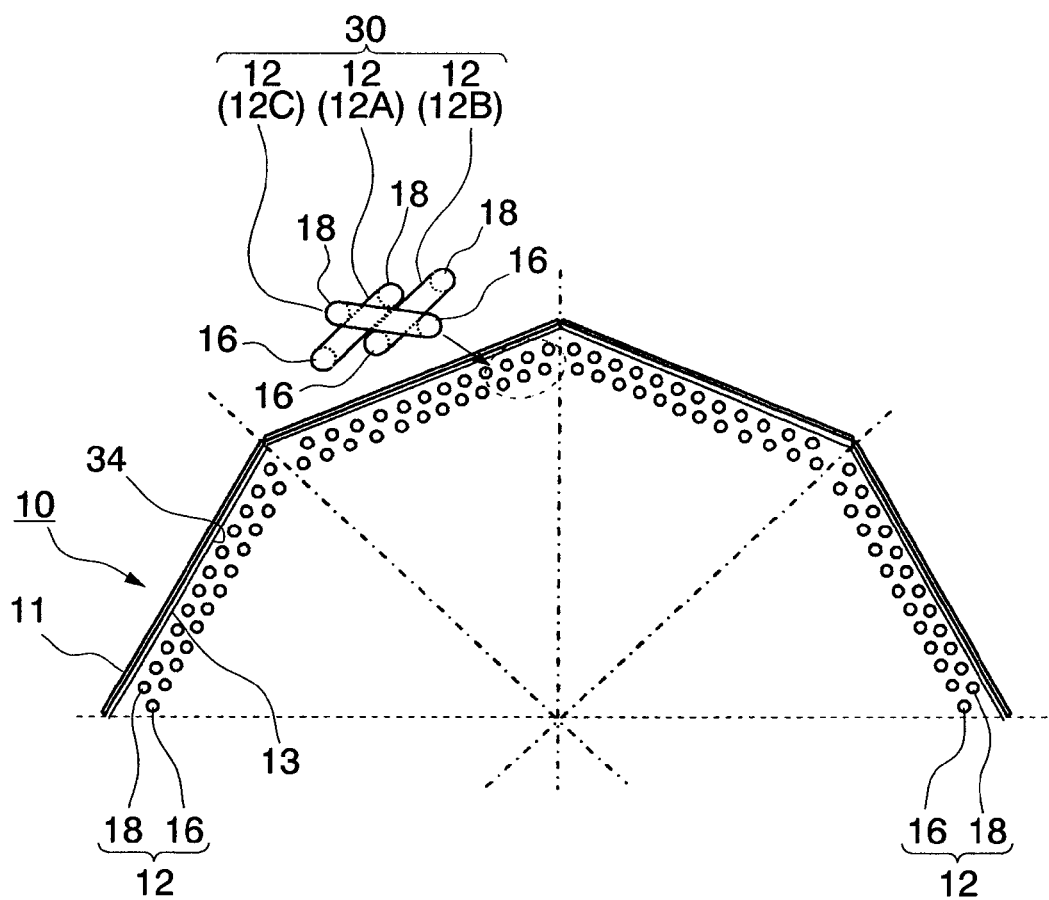
FIG. 5 is a plan view illustrating a positional relationship between a heat receiver body and a heat receiving tube.

Further, as shown in FIGS. 5 and 6, in the inner wall surface 13 of the heat receiver body 11 located on the downstream in the sunlight incident direction (the direction depicted by the arrow S) of the heat-exchange heat receiving tube 12, the reflection mirror 34 having a reflection surface 34A reflecting the sunlight is installed in the inner wall surface 13 with a heat-insulation member 32 and a cooled air passageway 33 interposed therebetween. The reflection mirror 34 is installed at the lower portion of the heat-exchange heat receiving tube 12, that is, a portion where the outward-flow heat receiving tube 16 and the inward-flow heat receiving tube 18 are arranged excluding the U tube 17. The reflected light of the sunlight incident via the gap 40 between the outward-flow heat receiving tube 16 and the inward-flow heat receiving tube 18 illuminate the rear surfaces of the outward-flow heat receiving tube 16 and the inward-flow heat receiving tube 18 so as to convert the reflected light into thermal energy. In addition, the reflection mirror 34 returns the radiation heat emitted from the heat-exchange heat receiving tube 12 to the rear surface of the heat-exchange heat receiving tube 12 so as to effectively and reliably heat the heat-exchange heat receiving tube 12, and to reduce an amount of the heat transferred from the collecting heat receiver 10 to the outside. Accordingly, it is possible to simplify the heat-insulation cooling structure of the heat receiver body 11.

As shown in FIGS. 6 and 7, a plurality of chevron protrusions 35 is provided on the reflection surface 34A of the reflection mirror 34. The chevron protrusions 35 are arranged at a predetermined interval on the reflection surface 34A of the reflection mirror 34 so as to have discontinuously different reflection angles with respect to the incident angles of the sunlight incident via the gap 40 between the outward-flow heat receiving tube 16 and the inward-flow heat receiving tube 18, thereby preventing the reflected light of the sunlight incident via the gap 40 from returning to the upstream in the sunlight incident direction (the direction depicted by the arrow S) through the gap 40.

The effect of the sunlight reflected by the reflection mirror 34 provided with the chevron protrusions 35 will be described with reference to FIGS. 8 and 9.

Figure 8:
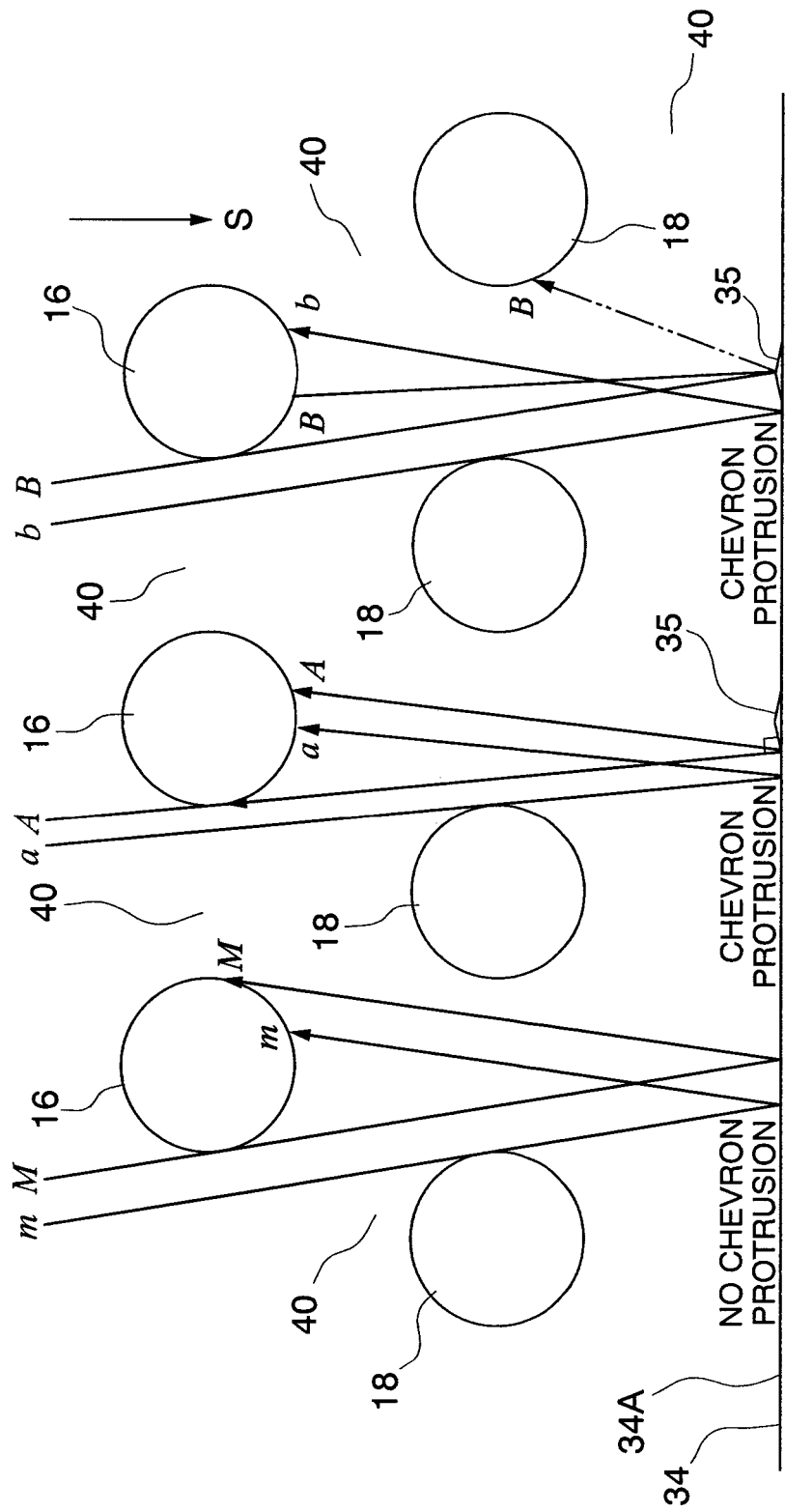
FIG. 8 is an explanatory diagram 1 illustrating sunlight of a reflection mirror provided with a chevron protrusion.
Figure 9:
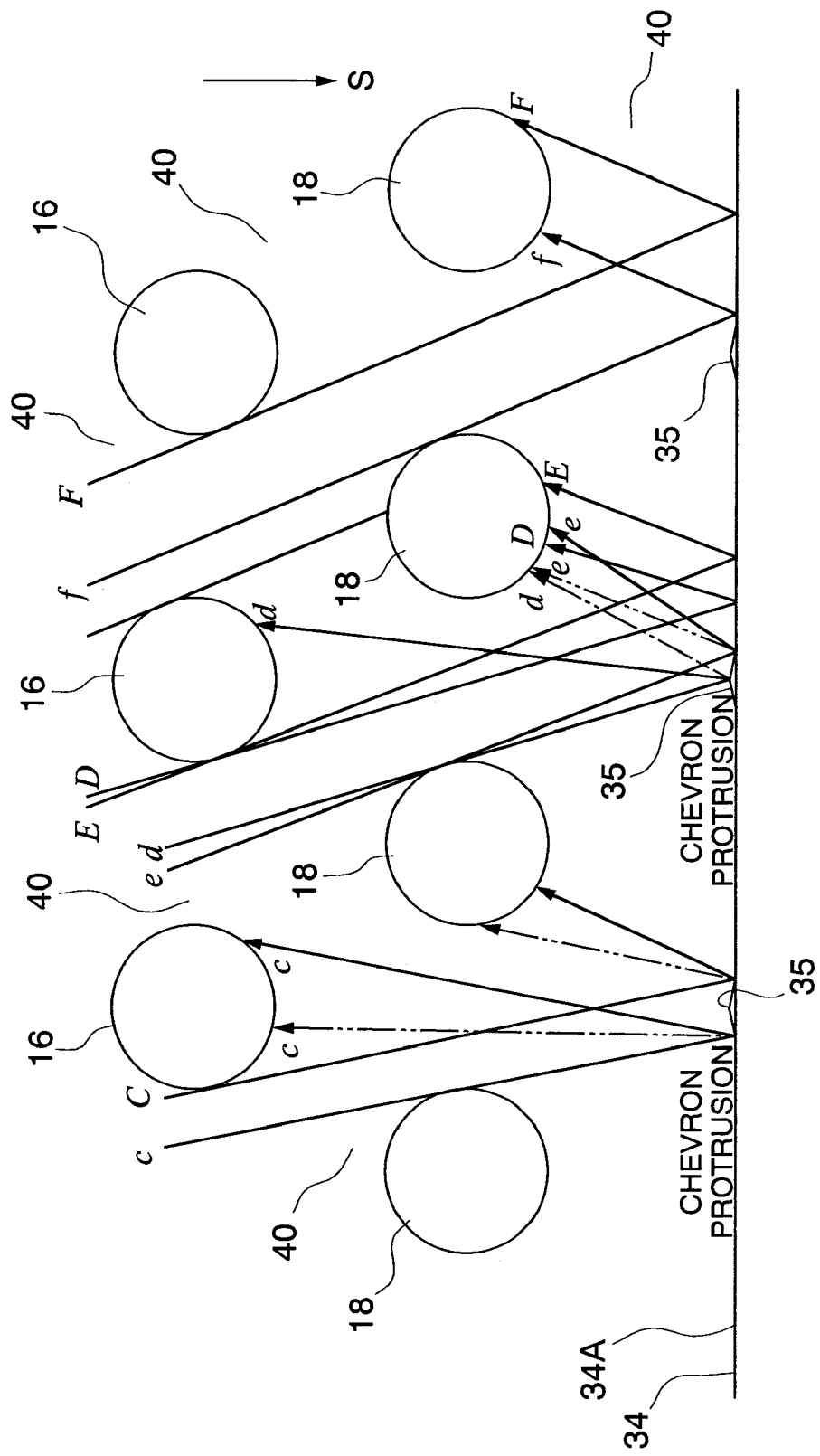
FIG. 9 is an explanatory diagram 2 illustrating sunlight of a reflection mirror provided with a chevron protrusion.
Figure 10:
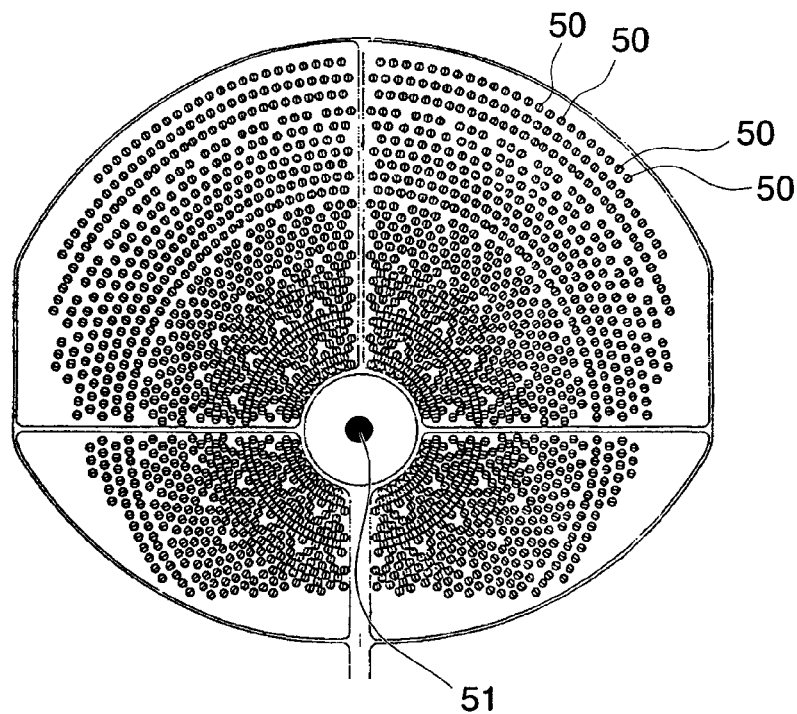
FIG. 10 is a plan view illustrating an example of an arrangement of heliostats provided in all areas around 360 degrees.
Figure 11:
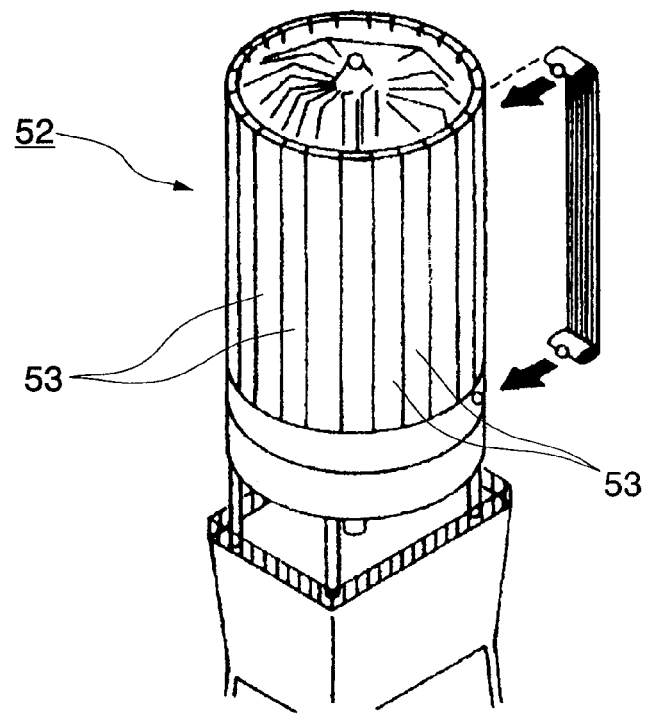
FIG. 11 is a perspective view illustrating a 360-degree collecting heat receiver.
Figure 12:
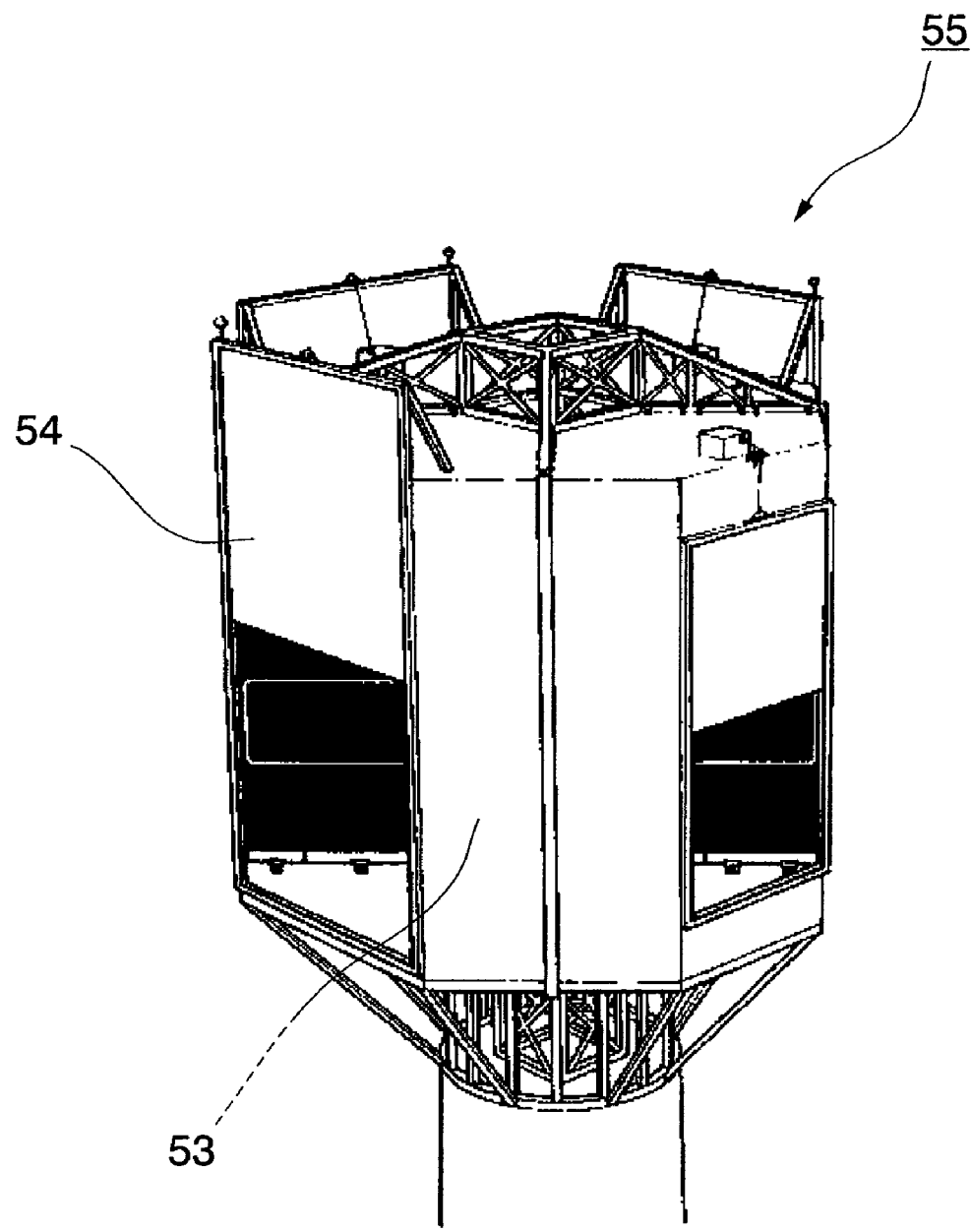
FIG. 12 is a perspective view illustrating a 360-degree collecting cavity heat receiver.
Figure 13:
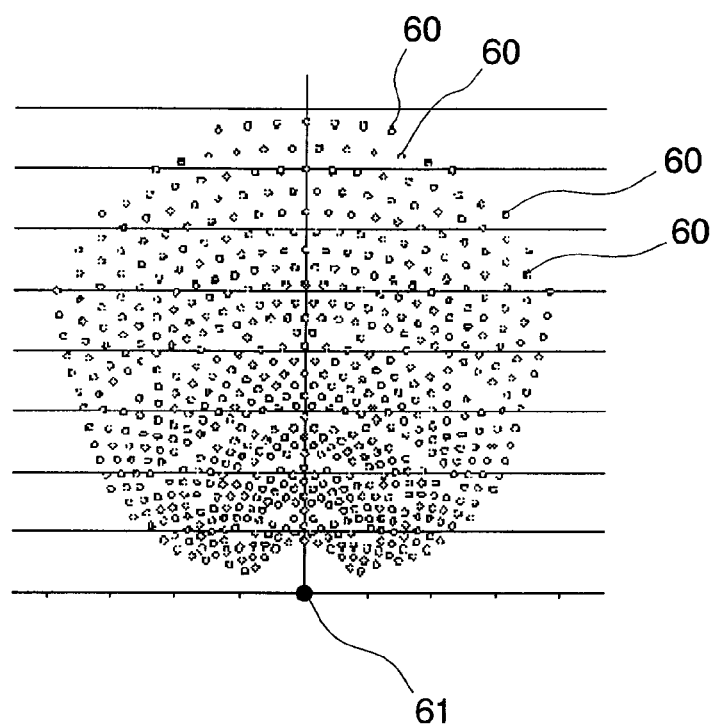
FIG. 13 is a plan view illustrating an example of an arrangement of heliostats provided in one side area.
Figure 14:
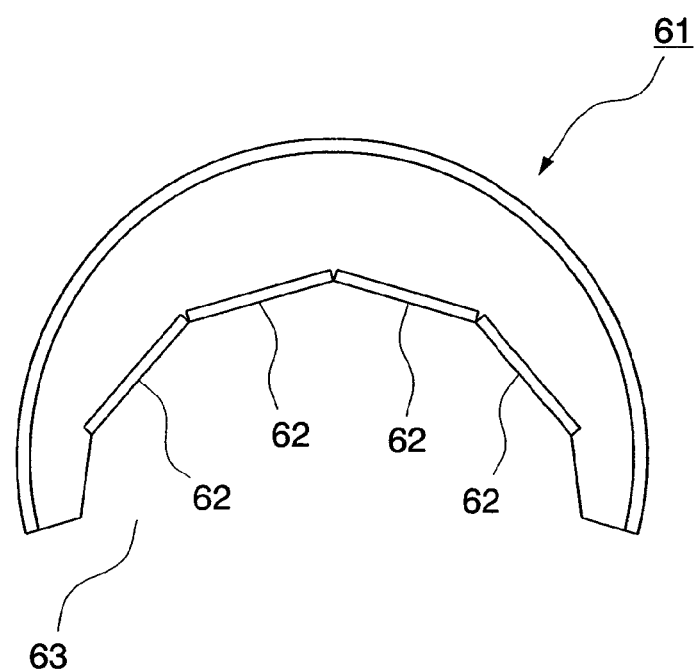
FIG. 14 is a cross-sectional view illustrating a heat receiver for heliostats provided in one side area.
Figure 15:
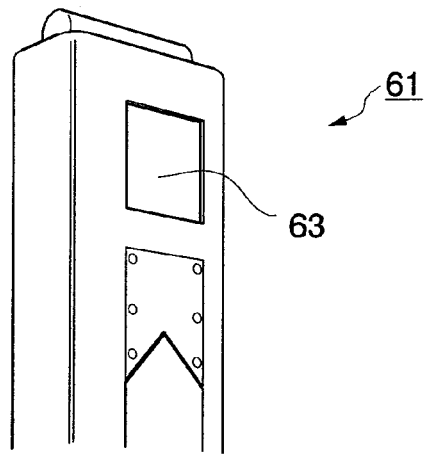
FIG. 15 is a diagram illustrating an appearance of a tower provided with the heat receiver shown in FIG. 14.
Figure 16:
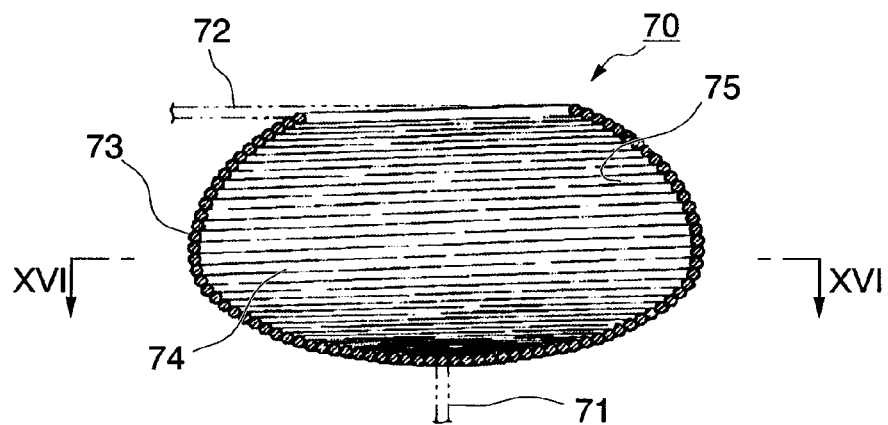
FIG. 16 is a schematic sectional view illustrating a sunlight collecting heat receiver.
Figure 17:
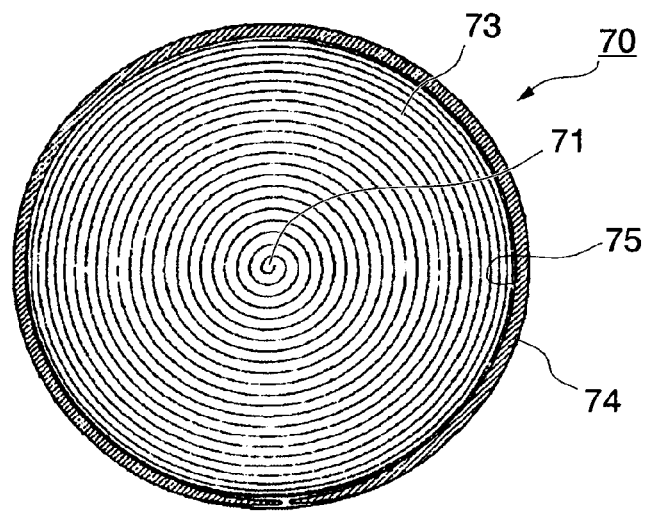
FIG. 17 is a sectional view taken along the line XVI-XVI in FIG. 16.

In FIGS. 8 and 9, in the reflection mirror 34 without the chevron protrusions 35, as depicted by the reference symbols M and m, the sunlight incident via the gap 40 may return to the upstream in the sunlight incident direction (the direction depicted by the arrow S) via another gap 40.

However, in this embodiment, in the reflection mirror 34 with the chevron protrusions 35, as depicted by the reference symbols A to E and a to e, since the reflection angles with respect to the incident angles of the sunlight incident via the gap 40 between the outward-flow heat receiving tube 16 and the inward-flow heat receiving tube 18 are set to be discontinuously different, it is possible to prevent the reflected light of the sunlight from returning to the upstream in the sunlight incident direction (the direction depicted by the arrow S) via the gap 40, and to allow the reflected light to illuminate the rear surfaces of the outward-flow heat receiving tube 16 and the inward-flow heat receiving tube 18. Accordingly, it is possible to effectively convert the reflected light into a heat on the outward-flow heat receiving tube 16 and the inward-flow heat receiving tube 18. In addition, the sunlight depicted by the reference symbols E and e show an example in which the sunlight incident to the reflection mirror 34 without the chevron protrusions 35 via the gap 40 do not return to the upstream via another gap 40.

Accordingly, since the reflected light of the sunlight incident via the gap 40 are directly converted into heat effectively heating the heat-exchange heat receiving tube 12, and the inner wall surface 13 of the heat receiver body 11 is formed as the reflection surface 34A by means of the reflection mirror 34, it is possible to suppress an increase in the thermal load of heat receiver body 11 due to the thermal conversion or a high level radiation heat, and thus to remarkably simplify the heat-insulation structure of the heat receiver body 11.

As described above in detail, in the tower-type sunlight collecting heat receiver 100 according to this embodiment, the heat-exchange heat receiving tube 12 transferring the energy of the sunlight to the heat carrier therein includes the outward-flow heat receiving tube 16 disposed on the upstream in the sunlight incident direction (the direction depicted by the arrow S) and the inward-flow heat receiving tube 18 connected to the outward-flow heat receiving tube 16 through the U tube 17 and disposed on the downstream in the sunlight incident direction (the direction depicted by the arrow S), and the outward-flow heat receiving tube 16 and the inward-flow heat receiving tube 18 are arranged so as to be deviated from each other in the transverse direction perpendicular to the height direction when seen in the sunlight incident direction (the direction depicted by the arrow S). For example, the outward-flow heat receiving tube 16 and the inward-flow heat receiving tube 18 are alternately arranged at the sunlight incident position. Accordingly, it is possible to reliably increase the temperature of the heat carrier circulating inside the outward-flow heat receiving tube 16 and the inward-flow heat receiving tube 18, and thus to uniformly increase the temperature of the heat-exchange heat receiving tube 12 including the outward-flow heat receiving tube 16 and the inward-flow heat receiving tube 18. Further, since the inward-flow heat receiving tube 18 in which the temperature of the heat carrier increases and which is disposed on the downstream in the sunlight incident direction (the direction depicted by the arrow S) is located at the shade of the outward-flow heat receiving tube 16, it is possible to reliably reduce the heat receiving amount, and thus to suppress the temperature rise of the surface of the inward-flow heat receiving tube 18 in the sunlight incident position. As a result, since it is possible to prevent the known problem in which the heat receiving tube is locally heated and temperature thereof exceeds the allowable temperature, the heat receiving tube is capable of efficiently transferring the thermal energy obtained from the sunlight.

In addition, in the tower-type sunlight collecting heat receiver 100 according to this embodiment, the reflection mirror 34 is provided on the downstream in the sunlight incident direction (the direction depicted by the arrow S) of the inward-flow heat receiving tube 18. Accordingly, the reflection mirror 34 is capable of reflecting the sunlight incident via the gap 40 between the outward-flow heat receiving tube 16 and the inward-flow heat receiving tube 18 arranged and deviated from each other in the transverse direction perpendicular to the height direction when seen in the sunlight incident direction (the direction depicted by the arrow S). In addition, it is possible to effectively convert the reflected light of the reflection mirror 34 into a heat in such a manner that the reflected light illuminate the rear surfaces of the outward-flow heat receiving tube 16 and the inward-flow heat receiving tube 18, and to heat the rear surfaces of the outward-flow heat receiving tube 16 and the inward-flow heat receiving tube 18. That is, it is possible to heat both front and rear surfaces of the outward-flow heat receiving tube 16 and the inward-flow heat receiving tube 18. Accordingly, it is possible to uniformly increase the temperature of the heat-exchange heat receiving tube 12 including the outward-flow heat receiving tube 16 and the inward-flow heat receiving tube 18. As a result, it is possible to prevent the known problem in which the heat receiving tube is locally heated and temperature thereof exceeds the allowable temperature.

Further, in the tower-type sunlight collecting heat receiver 100 according to this embodiment, a plurality of the heat-exchange heat receiving tubes 12 is provided so that the outward-flow heat receiving tubes 16 and the inward-flow heat receiving tubes 18 are deviated from each other in the transverse direction perpendicular to the height direction when seen in the sunlight incident direction (the direction depicted by the arrow S). Accordingly, it is possible to reliably increase the temperature of the heat carrier circulating inside the outward-flow heat receiving tubes 16 and the inward-flow heat receiving tubes 18. As a result, it is possible to uniformly increase the temperature of the heat-exchange heat receiving tubes 12 including the outward-flow heat receiving tubes 16 and the inward-flow heat receiving tubes 18.

Furthermore, in the tower-type sunlight collecting heat receiver 100 according to this embodiment, the reflection surface 34A of the reflection mirror 34 is provided with the chevron protrusions 35 for changing the direction of the sunlight passing through a gap between the heat-exchange heat receiving tubes 12. The chevron protrusions 35 are used to have different reflection angles with respect to the incident angles of the sunlight incident via the gap 40 between the outward-flow heat receiving tube 16 and the inward-flow heat receiving tube 18. Accordingly, it is possible to prevent the reflected light of the reflection mirror 34 from returning to the upstream in the sunlight incident direction (the direction depicted by the arrow 1), and to convert the reflected light into thermal energy in such a manner that the reflected light illuminate the rear surface of the heat-exchange heat receiving tube 12, where the thermal energy is added to the output of the energy of the sunlight collecting heat receiver 100.

Moreover, in the tower-type sunlight collecting heat receiver 100 according to this embodiment, the gaps 40 between the outward-flow heat receiving tubes 16 and the inward-flow heat receiving tubes 18 are set in consideration of whether the sunlight are sufficiently transferred to the outward-flow heat receiving tube 16 and the inward-flow heat receiving tube 18 and how much the sunlight are reflected by the reflection mirror 34. For example, the gaps 40 may be appropriately changed instead of forming the gaps 40 to be uniform in accordance with the sunlight radiation state in each of the heat receiving tube installation portions 14A to 14D. In addition, the shape of the protrusion 35 as the reflector is not limited to the mountain shape, but may be appropriately changed to other shapes such as a trapezoid shape and a semi-sphere shape.

While the exemplary embodiment of the invention is described with reference to the drawings, the detailed configuration of the present invention is not limited thereto, but may be modified in design within the scope not departing from the spirit of the invention.

INDUSTRIAL APPLICABILITY

The present invention relates to a sunlight collecting heat receiver used in a solar thermal power system, a solar thermal chemical plant, or the like, the sunlight collecting heat receiver being designed to collect sunlight, convert them into high thermal energy, and transfer the thermal energy to a heat carrier through thermal conduction.

DESCRIPTION OF REFERENCE NUMERALS

2 HELIOSTAT
10 COLLECTING HEAT RECEIVER
12 HEAT-EXCHANGE HEAT RECEIVING TUBE
16 OUTWARD-FLOW HEAT RECEIVING TUBE
17 U TUBE
18 INWARD-FLOW HEAT RECEIVING TUBE
34 REFLECTION MIRROR
35 CHEVRON PROTRUSION
40 GAP
100 SUNLIGHT COLLECTING HEAT RECEIVER

The invention claimed is:

1. A sunlight collecting heat receiver comprising:
a heat-exchange heat receiving tube which receives sunlight collected by heliostats and transfers heat to a heat carrier,
wherein the heat-exchange heat receiving tube includes an outward-flow heat receiving tube which is disposed on the upstream in a sunlight incident direction and an inward-flow heat receiving tube which is disposed on the downstream in the sunlight incident direction,
wherein a single U tube which connects an outlet of the outward-flow heat receiving tube and an inlet of the inward-flow heat receiving tube,
wherein a plurality of heat-exchange heat receiving tubes is provided so that the outward-flow heat receiving tubes and the inward-flow heat receiving tubes are deviated from each other in a direction perpendicular to the height direction when seen in the sunlight incident direction, and
wherein a reflection minor which reflects the sunlight passing through gaps between the outward-flow heat receiving tubes and the inward-flow heat receiving tubes so that the reflected light illuminate rear surfaces of the outward-flow heat receiving tubes and the inward-flow heat receiving tubes is further provided on the downstream in the sunlight incident direction of the inward-flow heat receiving tubes.

2. The sunlight collecting heat receiver according to claim 1, wherein a reflection surface of the reflection minor is provided with reflectors which have different reflection angles with respect to incident angles of the sunlight passing through gaps between the outward-flow heat receiving tubes and the inward-flow heat receiving tubes so as to prevent reflected light of the reflection minor from returning to the upstream in the sunlight incident direction, and to make the reflected light illuminate the rear surfaces of the outward-flow heat receiving tubes and the inward-flow heat receiving tubes.

3. The sunlight collecting heat receiver according to claim 1,
wherein a heat receiving tube body is formed by one group of the heat-exchange heat receiving tubes in which at least one heat-exchange heat receiving tube is disposed so as to pass over the other heat-exchange heat receiving tubes.

4. The sunlight collecting heat receiver according to claim 3,
wherein the heat receiving tube body is formed by one group of the three heat-exchange heat receiving tubes in which two heat-exchange heat receiving tubes are disposed in parallel to each other, and one heat-exchange heat receiving tube is disposed so as to pass over the two heat-exchange heat receiving tubes disposed in parallel to each other.

5. The sunlight collecting heat receiver according to claim 4, wherein a plurality of the heat-exchange heat receiving tubes is arranged so that a gap between the outward-flow heat receiving tubes, a gap between the inward-flow heat receiving tubes, a gap between the outward-flow heat receiving tube and the inward-flow heat receiving tube, and a gap between the inward-flow heat receiving tube and a reflection mirror are equal to each other.

* * * * *